United States Patent
Guyon et al.

(10) Patent No.: US 9,594,364 B2
(45) Date of Patent: Mar. 14, 2017

(54) METHOD AND DEVICE FOR DISTRIBUTING ELECTRICITY FLOWS AND ELECTRICAL SYSTEM COMPRISING SUCH A DEVICE

(71) Applicant: Schneider Electric Industries SAS, Rueil-Malmaison (FR)

(72) Inventors: Caroline Guyon, Saint Martin le Vinoux (FR); Patrick Beguery, Bernin (FR); Mohamed Yacine Lamoudi, La Tronche (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 915 days.

(21) Appl. No.: 13/941,007

(22) Filed: Jul. 12, 2013

(65) Prior Publication Data
US 2014/0025212 A1    Jan. 23, 2014

(30) Foreign Application Priority Data
Jul. 17, 2012   (FR) .................................. 12 56903

(51) Int. Cl.
  *G05B 11/01*  (2006.01)
  *G05B 19/02*  (2006.01)
  (Continued)

(52) U.S. Cl.
  CPC .......... *G05B 19/02* (2013.01); *B60L 11/1842* (2013.01); *B60L 11/1844* (2013.01);
  (Continued)

(58) Field of Classification Search
  None
  See application file for complete search history.

(56) References Cited

U.S. PATENT DOCUMENTS

| 2010/0017045 A1 | 1/2010 | Nesler et al. | |
| 2012/0173034 A1* | 7/2012 | Taima | B60L 3/12 700/295 |

FOREIGN PATENT DOCUMENTS

| WO | WO 2008/073453 A1 | 6/2008 |
| WO | WO 2010/042550 A2 | 4/2010 |

OTHER PUBLICATIONS

French Preliminary Search Report issued Apr. 11, 2013, in French 1256903, filed Jul. 17, 2012 (with English Translation of Categories of Cited Documents).

* cited by examiner

*Primary Examiner* — Wissam Rashid
(74) *Attorney, Agent, or Firm* — Oblon, McClelland, Maier & Neustadt, L.L.P.

(57) ABSTRACT

A method for distributing, during a given time period, electricity flows in a system having at least one production and one consumption element, and provides for measuring the state of charge of each storage element and electrical powers produced and consumed. Initialization steps include defining physical modeling parameters, defining a model, in the form of state representation using the physical parameters, defining optimization parameters, and predefining an optimization problem, over the given time period, for the distribution of the electricity flows using the model. Iterative steps, at successive updating times of the given time period, include measuring a state of charge of each storage element and the electricity production and consumption powers, updating a preview of the behavior of the production and consumption elements for another given time period, defining the formulation of the optimization problem for the other time period, solving the problem, and applying electricity distribution controls.

13 Claims, 3 Drawing Sheets

(51) Int. Cl.
  *B60L 11/18* (2006.01)
  *H02J 3/38* (2006.01)
(52) U.S. Cl.
  CPC ....... *B60L 11/1848* (2013.01); *B60L 11/1861* (2013.01); *H02J 3/38* (2013.01); *H02J 3/383* (2013.01); *Y02E 10/563* (2013.01); *Y02E 60/721* (2013.01); *Y02T 10/7005* (2013.01); *Y02T 10/705* (2013.01); *Y02T 10/7044* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

METHOD AND DEVICE FOR DISTRIBUTING ELECTRICITY FLOWS AND ELECTRICAL SYSTEM COMPRISING SUCH A DEVICE

BACKGROUND OF THE INVENTION

The present invention relates to a method for distributing, during a given time period, electricity flows in a system comprising at least one production element and one consumption element of electricity from an electricity distribution network, a building, an electricity storage element, a local electricity production source, and comprising means for measuring the state of charge of each storage element and electrical powers produced and consumed by each of the elements of the system.

The present invention also relates to a device for distributing electricity flows suitable for implementing such a method and an electrical system comprising such a device.

In the field of electricity production, devices and methods for connecting vehicles equipped with batteries and means for producing electricity to an infrastructure are known. These vehicles are wherein they are capable not only of being autonomous in respect of energy after a charging phase, but also that they are capable of supplying power to the above-mentioned infrastructure when the batteries are full, thus making it possible to continue storing electricity. In this way, the document CA-A-2668276 describes a solar electric vehicle wherein the excess energy is used to supply electricity to an adjacent building. Similarly, the document WO-A-2011/024067 describes an electric vehicle used as a secondary energy source. These documents describe systems for enhancing local energy production.

However, this enhancement of electricity management remains limited to a basic system comprising an infrastructure and a vehicle, the system merely comprising a single locally produced energy source. Furthermore, supply to the infrastructure is not configurable and only occurs when the vehicle battery is full, which is rarely necessary.

SUMMARY OF THE INVENTION

The aim of the invention is thus that of providing a method for distributing electricity flows in a system comprising various electricity producers and consumers, wherein the method is configurable so as to account for the specificities of the system producers and consumers and the type of distribution sought.

For this purpose, the invention relates to a method of the type mentioned above comprising at least the following steps:

initialisation steps consisting of:

a) defining physical system modeling parameters, b) defining a model of the system, in the form of state representation using the physical parameters determined in step a), c) defining optimisation parameters for solving an optimisation problem and d) predefining an optimisation problem, over the given time period, for the distribution of the electricity flows of the system using the model defined in step b), and iterative steps consisting, at successive updating times of the given time period, of:

e) measuring a state of charge of each electricity storage element and the electricity production and consumption powers of the various elements of the system, f) updating a preview of the behaviour of the production and consumption elements of the system for another time period of the same duration as the duration of the given time period and starting at a considered updating time, g) defining the formulation of the optimisation problem for the other time period, h) solving the problem in step g) using a solver, and i) applying electricity distribution controls in the system using the solutions from step h), until the next iteration.

According to further advantageous aspects of the invention, the distribution method comprises one or a plurality of the following features, taken alone or in any technical feasible combination:

step a) comprises the definition of parameters for determining a production and/or consumption profile of at least one element of the system over the time period;

step c) for defining the optimisation parameters comprises at least the definition of the time period and an updating period defining the interval between two iterative steps;

the system model is defined with the following state representation:

$$\begin{cases} x_{k+1} = Ax_k + Bu_k + Gw_k \\ y_k = Cx_k + Du_k + Fw_k \end{cases}$$

where $x_k$ and $x_{k+1}$ are the states x of the system at times k and k+1, $y_k$ is an output parameter y of the system at the time k, $u_k$ is a control parameter at the time k, $w_k$ is a disturbance parameter w at the time k and A, B, G, C, D, F are constant matrices;

the state x of the system corresponds to the state of charge of each electricity storage element;

the control parameter u is defined according to the following vector:

$$u = [P_{charge}^{M_{11}} \; P_{discharge}^{M_{11}} \; P_{purchase}^{M_{14}} \; P_{resale}^{M_{14}} \; P_{localCons}^{M_8}]^T$$

where $P_{charge}^{M_{11}}$ and $P_{discharge}^{M_{11}}$ are charge and discharge powers for each storage element, respectively, $P_{purchase}^{M_{14}}$ and $P_{resale}^{M_{14}}$ are purchased and resold powers for each distribution network and $P_{localCons}^{M_8}$ corresponds to the local powers produced by each element of the system and consumed locally;

the disturbance parameter w is defined according to the following vector:

$$w = [P_{prod}^{M_8} \; E_{vehicle}^{M_{10}}]^T$$

where $P_{prod}^{M_8}$ corresponds to the electrical powers produced locally by each local production source, and $E_{vehicle}^{M_{10}}$ corresponds to the energies consumed by each electric vehicle incorporating one or a plurality of storage elements, when said elements are not connected to the rest of the system;

the system output parameter is defined according to the following vector:

$$y = [P_{building}^{M_4} \; x \; 0]^T$$

where $P_{building}^{M_4}$ corresponds to the power supplied to each building, and x corresponds to the states of charge of each storage element;

step d) for predefining the optimisation problem consists of modeling the behaviour of the system for the given time period using the following equation:

$$\tilde{Y} = \phi x_0 + \psi \tilde{U} + \xi \tilde{w}$$

where $x_0$ is an initial state of the system, $\tilde{Y}$, $\tilde{U}$ and $\tilde{w}$ are power, control and disturbance parameters of the system, respectively, for the given time period, expressed in matrix form, and $\phi$, $\psi$ and $\xi$ are constant matrices wherein the elements are dependent on the constant matrices A, B, G, C, D and F; and step g) for formulating the optimisation problem comprises at least the definition of an objective function $f(\tilde{U})$ and updating of optimisation problem constraints, these constraints being expressed in the form of the following inequality:

$$A_{in}\tilde{U} \leq b_{in}$$

where $\tilde{U}$ is the control parameter for the given time period, $A_{in}$ a matrix dependent on the matrix $\psi$, and $b_{in}$ a matrix dependent on the matrices $\psi$ and $\xi$, the minimum $\tilde{Y}_{min}$ and maximum values $\tilde{Y}_{max}$ of the output parameter $\tilde{Y}$, and the maximum variation $\delta\tilde{U}_{max}$ of the control $\tilde{U}$.

The invention also relates to a distribution device suitable for implementing the method mentioned above and, more specifically, a device for distributing, during a given time period, electricity flows in a system comprising at least one production element and one consumption element of electricity from an electricity distribution network suitable for supplying and/or receiving energy from other elements of the system, an electricity storage element suitable for receiving the energy production from the energy production elements and/or for supplying energy to the energy consumption elements of the system, a building suitable for consuming energy produced locally and/or from the distribution network and/or from a storage element, and an electricity production source suitable for supplying energy to the network and/or building and/or storage element, and also comprising means for measuring the state of charge of each storage element and electrical powers produced and consumed by each of the elements of the system. This device is wherein it comprises calculation means configured to implement:

initialisation steps consisting of:
a) defining physical system modeling parameters,
b) defining a model of the system, in the form of state representation using the physical parameters determined in step a),
c) defining optimisation parameters for solving an optimisation problem, and
d) predefining the optimisation problem, over the given time period, for the distribution of the electricity flows from the system using the model defined in step b), and iterative steps consisting, at successive updating times of the given time period, of:
e) measuring the state of charge of each electricity storage element and the electricity production and consumption powers of the various elements of the system,
f) updating a preview of the behaviour of the production and consumption elements of the system for another time period of the same duration as the duration of the given time period and starting at an updating time in question,
g) defining the formulation of the optimisation problem for the other time period,
h) solving the problem in step g) using a solver, and
i) applying electricity distribution controls in the system using the solutions from step h), until the next iteration.

According to further advantageous aspects of the invention, the device for distributing electricity flows comprises one or a plurality of the following features, taken alone or in any technical feasible combination:

the storage element comprises at least one storage battery arranged on an electric vehicle.

The invention finally relates to an electric system comprising at least one production element and one consumption element of electricity from: a distribution network, a building, a storage element, a local electricity production source, and also comprising measurement means as envisaged above. This system comprises a distribution device as mentioned above, whereas the intelligent electricity distribution network communicates dynamically with the distribution device, particularly on the energy purchase and sale prices and/or the power available from the distribution network and/or the presence of off-peak times in respect of network energy usage.

BRIEF DESCRIPTION OF THE DRAWINGS

The features and advantages of the invention will emerge on reading the description hereinafter, given merely as a non-limiting example, with reference to the appended figures, wherein.

DETAILED DESCRIPTION OF PREFERRED EMBODIMENTS

Figure 1:
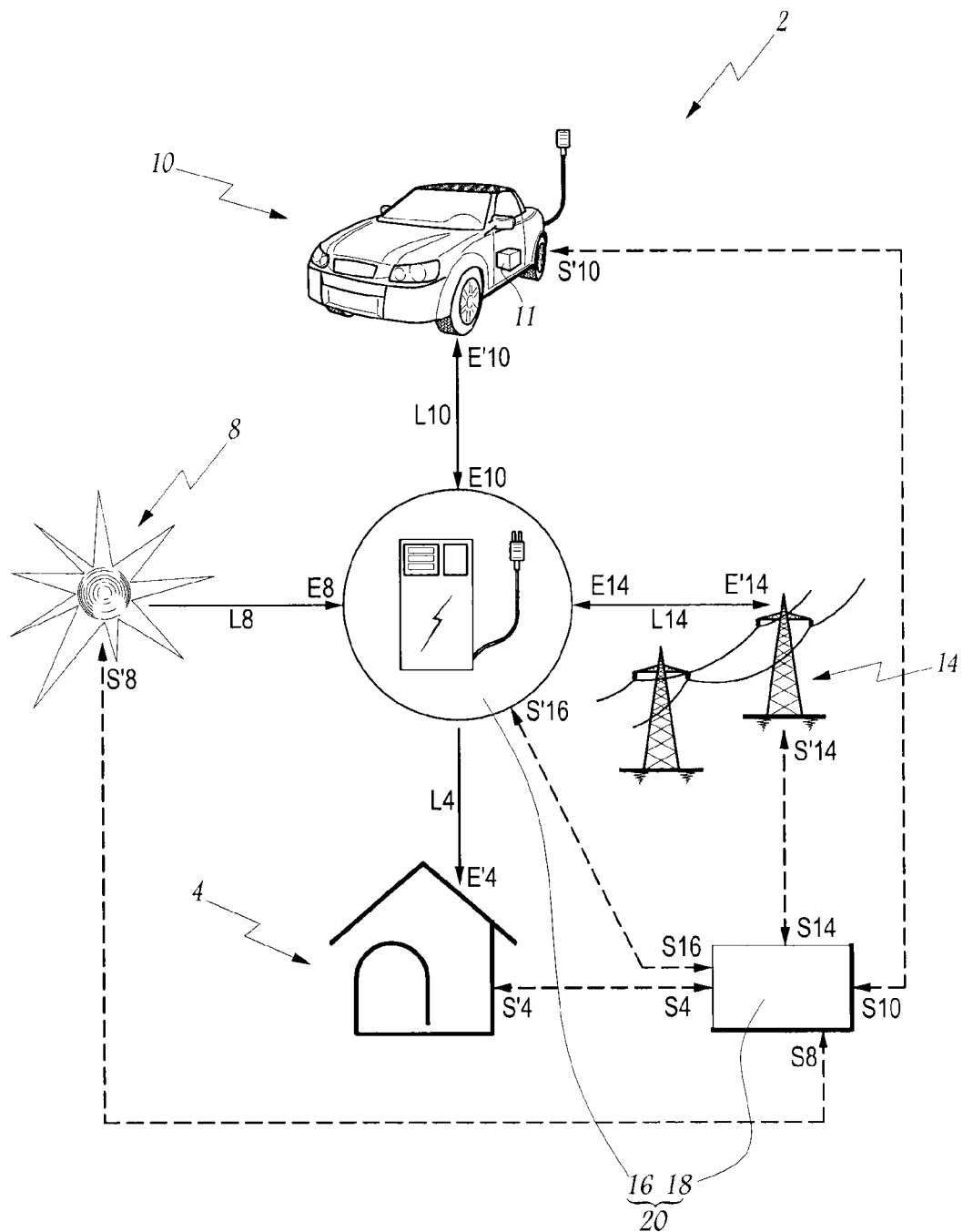
FIG. 1 is a schematic representation of a system comprising a device for distributing electricity according to the invention connected to electricity production and consumption elements.

In FIG. 1, a system 2 comprises a building 4, a local electricity production source 8, an electric vehicle 10 equipped with an electricity storage element 11, an electric distribution network 14, a distribution frame 16 and a monitoring unit 18.

Hereinafter in the description and as seen in FIG. 1, LP denotes a link shown as a solid line in FIG. 1 and connecting the distribution frame 16 with an element of the system 2 for which the reference is a natural number P equal to 4, 8, 10 or 14. This link LP is a conductive link suitable for carrying electricity. Similarly, EP and E'P, respectively, denote the direction of electricity transfer from an element referenced P to the distribution frame 16 and those from the distribution frame 16 to an element referenced P. For example, the distribution network 14 is connected to the distribution frame 16 via the link L14. The energy transferred from the building 14 to the distribution frame 16 is referenced E14, whereas the energy transferred from the distribution frame 16 to the building 14 is referenced E'14.

Similarly, each element of the system 2 is suitable for communicating via data links represented as a dotted line in FIG. 1, where P is a natural number representing a reference seen in FIG. 1. By convention, SP denotes a signal communicated by the element P of the system 2 to the monitoring unit 18 and S'P a signal communicated from the monitoring unit 18 to the element P. For example, the electric network 14 and the unit 18 are suitable for communication in both directions and S14 denotes the signal sent by the network 14 to the unit 18 and S'14 the signal sent from the unit to the network 14.

The building 4 is suitable for consuming electricity produced by the local source 8, the storage element 10, or the distribution network 14.

The local source 8 for producing electricity E8 is, according to the embodiment seen in FIG. 1, a photovoltaic cell facility. Alternatively, this production source comprises wind generators or other electricity production means such as a turbine. This local source may, for example, be fitted in the building 4 and/or the vehicle 10. All the locally produced energy E8 is routed to the distribution frame 16 via the link L8.

The electric vehicle 10 is suitable for storing, in the storage element 11 thereof, electricity E'10 produced by the production elements 8, 10, 14 of the system 2 and routed via the distribution frame 16. In practice, this storage element 11 is a storage battery and the electricity E'10 is stored in the battery 11 for subsequent use of the vehicle 10. Hereinafter, the storage element 11 is considered to be suitable for storing an energy E'10, and supplying an energy E10 to the distribution frame 16.

The electric distribution network 14 transports the electricity E14 routed to the distribution frame 16. It can also receive electricity E'14 from the distribution frame 16 for the resale of locally produced electricity by the production elements 8, 10 of the system 2. This electric distribution network 14 is referred to as a "smart grid" in that it communicates information to the monitoring unit 18 relating, for example, to changes in energy rates, the powers available on the network 14, or off-peak periods, as represented by the signal S14 in FIG. 1.

The distribution frame 16 is connected to each element 4, 8, 10, 14, 18 of the system. It is suitable for guiding the electricity flows E4, E'4, E8, E10, E'10, E14, E'14 between the various production 4, 8, 10, 14 and/or consumption elements 4, 10, 14 of the system 2, as shown in FIG. 1.

The monitoring unit 18 is, similar to the distribution frame 16, connected to each element 4, 8, 10, 14, 16 of the system 2. It is suitable for communicating with these elements in both directions, in order to receive measurements of the powers produced or consumed by each of the elements 4, 8, 10 and 14 and the state of the distribution frame 16, via the signals S4, S8, S10, S14 and S16, and controlling the behaviour of each of these elements 4, 8, 10, 14, 16, via the signals S'4, S'8, S'10, S'14 and S'16.

Figure 2:
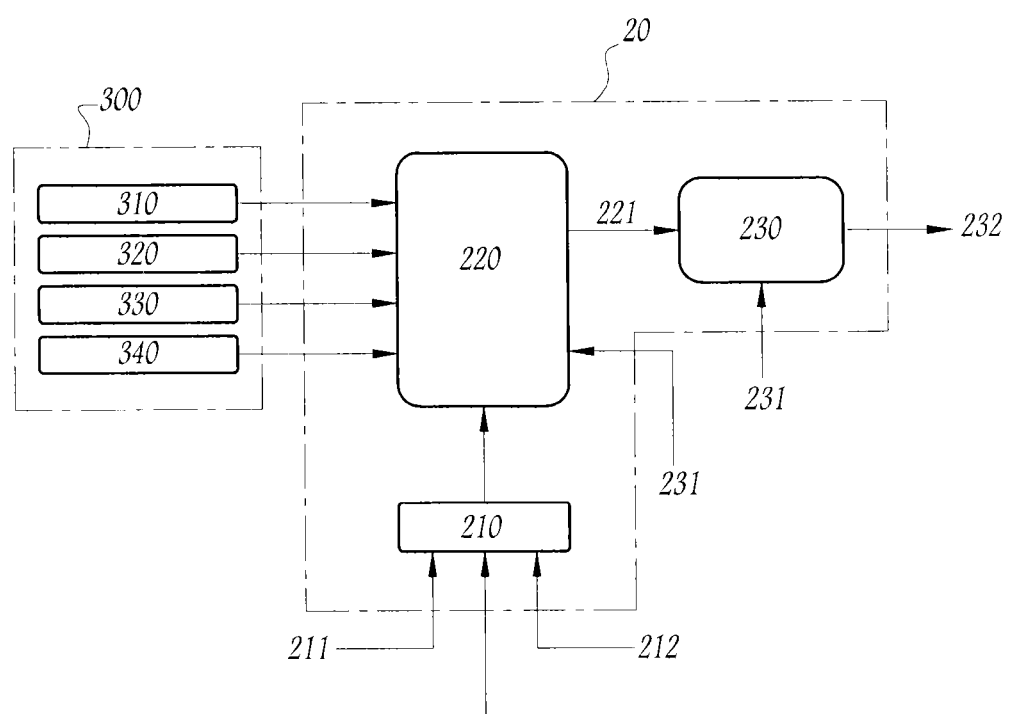
FIG. 2 is a schematic representation of the input and output data streams to and from the monitoring unit seen in FIG. 1.
Figure 3:
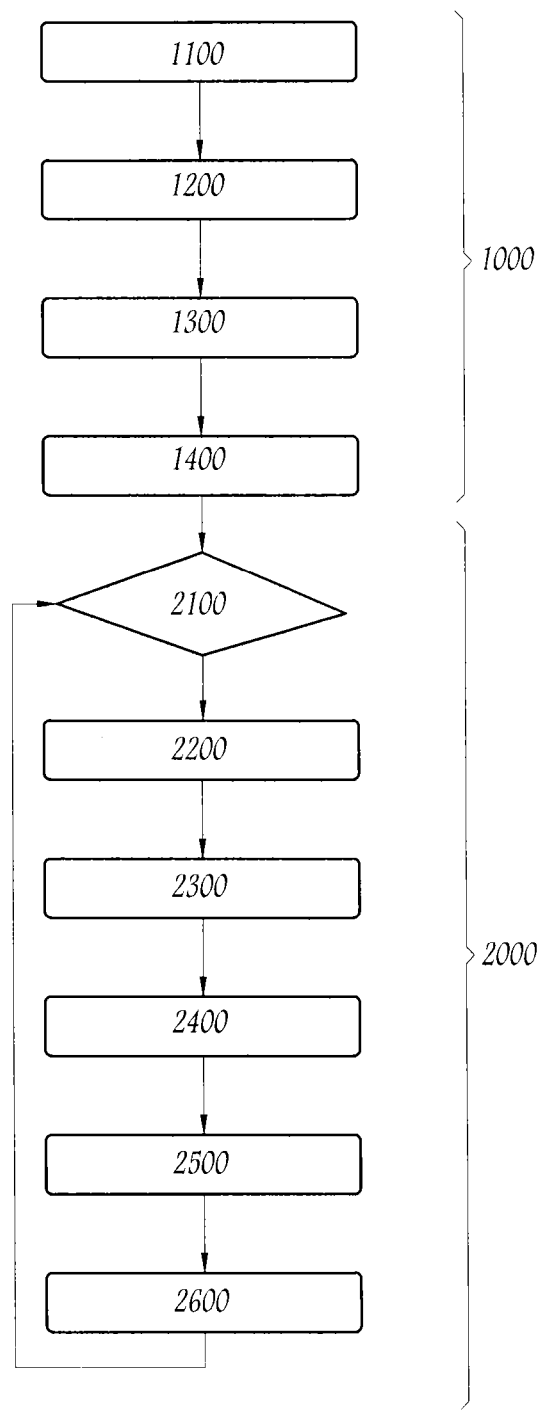
FIG. 3 is a block diagram of a method according to the invention for distributing electricity flows in the system seen in FIG. 1.

The monitoring unit 18 forms, with the distribution frame 16, a device 20 for distributing the electricity flows produced E8, E10, sold E'14 and consumed E'4, E'10, E14 in the system 2. For this distribution, the device 20 is suitable for solving an optimisation problem for, on the basis of data on the behaviour of the elements 4, 8, 10 and 14 of the system 2, defining suitable distribution controls for a user's requirements. These data and controls can be seen more specifically in FIG. 2.

The device 20 comprises a configuration unit 210, an optimisation unit 220 and a servo-control unit 230 distributed between the components 16 and 18 of the device 20, preferably situated in the unit 18.

The configuration unit 210 stores first data 211, second data 212 and third data 213. The first data 211 are system architecture data relating, for example, to the number of type of elements present in the system 2, and the arrangement thereof. The second data 212 are physical parameters of the elements of the system 2 conditioning the production and/or consumption of the various elements. For example, such physical parameters are the storage capacity of the battery 11, or the subscribed demand from the network.

The third data 213 are optimisation parameters used for calculating the energy distribution in the system 2. These data 213 include the duration of a given time period $T_{total}$ for which the optimisation problem is defined, the duration of an updating period $T_{update}$ consisting of the period separating two consecutive optimisation problem-solving operations, a duration separating two times k and k+1, or an objective function to be determined according to the energy distribution mode sought, such as for example distribution minimising the purchase of electricity from the distribution network 14.

Hereinafter in the description, an embodiment is described, wherein the time period $T_{total}$ has a duration of twenty-four hours, the updating period $T_{update}$ has a duration of ten minutes and the duration separating two times k and k+1 is one minute.

The data of the configuration unit 210 are only modified following the modification, addition or removal of an element of the system 2, or following a modification of the optimisation parameters.

The optimisation unit 220 performs, according to the updating period $T_{update}$, i.e. every ten minutes, an iterative calculation using the data 211, 212, 213, which are time-independent. Moreover, the optimisation unit 220 uses, for the same calculation, the data of a group 300 of modules 310, 320, 330, 340 which are updated at the end of each updating period $T_{update}$, i.e. every ten minutes.

This group 300 comprises a first module 310 comprising production estimations of each energy production element of the system for the next time period $T_{total}$, i.e. the next twenty-four hours, a second module 320 comprising the consumption estimations of the energy consumption elements of the system 2 for the next twenty-four hours, a third module 330 comprising the data on consumption and production for the next twenty-four hours envisaged for the vehicle 10 and a fourth module 340 comprising data on the behaviour of the distribution network 14 for the next twenty-four hours. For example, the production and consumption data of the elements 4, 8, 10 and 14 of the system 2 are projected production and consumption profiles suitable for accounting for weather-related parameters, if required. These data are accessible, for example from a server not shown in the figures, via an Internet connection, or any other type of connection for transferring these data. As a further example, these data may be obtained from a local, for example weather, station for predicting the behaviour of local energy producers 8.

The optimisation unit also communicates with a servo-control unit 230 intended to adapt the power set-points 221 of the optimisation unit 220 according to the measurement of the actual electric powers 231 of the elements of the system 2.

The optimisation unit 220 is the central calculating unit of the distribution device 20. It uses the data 211, 212, 213 from the configuration unit 210, the updating data form the group 300 of modules 310, 320, 330, 340 and the actual power measurements 231, to determine the power set-points 221 for distributing energy in the system 2.

The servo-control unit 230 compares the set-points 221 and the power measurements 231, to define a power flow control 232. This control 232 consists of the set of power flow control signals S'4, S'8, S'10, S'14, S'16.

The method comprises a first initialising phase 1000 and a second iterative calculating phase 2000.

The initialising phase 1000 comprises a first step 1100 for defining physical system modeling parameters 212, a second step 1200 for defining a model of the system, in the form of state representation using the physical parameters 212 determined in step 1100 along with the system architecture data 211, a third step 1300 for defining problem-solving optimisation parameters 213, and a fourth and final step 1400 for predefining an optimisation problem, over the time period $T_{total}$ determined in the step 1300 and which is twenty-four hours in this case, using the model defined in the step 1200.

In the first step 1100, the physical parameters 212 of the system 2 are defined, i.e., for each element 4, 8, 10 and 14 of the system 2, physical quantities conditioning the electricity consumption or production thereof, and thus the energy distribution in the system 2, are determined. For the car 10, for example, these parameters include the efficiency of the storage battery 11. In the second step 1200, a model of the system 2 is defined using the state representation defined by the following set of equations [1]:

$$\begin{cases} x_{k+1} = Ax_k + Bu_k + Gw_k \\ y_k = Cx_k + Du_k + Fw_k \end{cases} \quad [1]$$

where $x_k$ and $x_{k+1}$ are the states x of the system at times k and k+1, separated in the example by one minute, $y_k$ is an output parameter y of the system at the time k, $u_k$ is a control parameter at the time k, $w_k$ is a disturbance parameter w at the time k and A, B, G, C, D, F are constant matrices.

In the example of an embodiment described, the system state is the state of charge of the battery 11. The control parameter u is defined according to the following equation [2]:

$$u = [P_{charge} \; P_{discharge} \; P_{purchase} \; P_{resale} \; P_{localCons}]^T \quad [2]$$

where $P_{charge}$ and $P_{discharge}$ are charge and discharge powers of the storage element 11, $P_{purchase}$ and $P_{resale}$ resale are purchased and resold powers in respect of the distribution network 14, and/or $P_{localCons}$ is a locally consumed power. In equation [2] and hereinafter in the description, the exponent T is used to denote the transposition of a matrix. Equation [2] is a specific case of the general equation [2a] hereinafter defining the control parameter u for any number of storage elements 11, networks 14 and local energy production sources 8:

$$u = [P_{charge}^{M11} \; P_{discharge}^{M11} \; P_{purchase}^{M14} \; P_{resale}^{M14} \; P_{localCons}^{M8}]^T \quad [2a]$$

where $P_{charge}^{M11}$ and $P_{discharge}^{M11}$ are charge and discharge powers for each storage element 11, respectively, $P_{purchase}^{M14}$ and $P_{resale}^{M14}$ are purchased and resold powers for each distribution network 14 and $P_{localCons}^{M8}$ corresponds to the local powers produced by each element 8, 10 of the system 2 and consumed locally.

The disturbance parameter w is defined according to the following equation [3]:

$$w = [P_{prod} \; E_{vehicle}]^T \quad [3]$$

where $P_{prod}$ is a locally produced power and $E_{vehicle}$ an energy consumed by the electric vehicle 10 incorporating the storage element 11 when the storage element is not connected to the rest of the system, i.e. when the vehicle 10 is in use. Equation [3] is a specific case of the following general equation [3a]

$$w = [P_{prod}^{M8} \; E_{vehicle}^{M10}]^T \quad [3a]$$

where $P_{prod}^{M8}$ corresponds to the electrical powers produced locally by each local production source 8, and $E_{vehicle}^{M10}$ corresponds to the energies consumed by each electric vehicle 10 incorporating one or a plurality of storage elements 11, when said elements are not connected to the rest of the system 2.

The system output parameter y is defined according to the following equation [4]:

$$y = [P_{building} \; x \; 0]^T \quad [4]$$

where $P_{building}$ is the power supplied to the building 4 and x the state of charge of the battery 11. Equation [4] is a specific case of the following equation [4a]:

$$y = [P_{building}^{M4} \; x \; 0]^T \quad [4a]$$

where $P_{building}^{M4}$ corresponds to the power supplied to each building 4, and x corresponds to the states of charge of each storage element 11.

During the step 1300, the unit 18 defines the optimisation parameters 213. This step 1300 includes the choice of the time included for the definition of the optimisation problem, i.e. twenty-four hours in the example in question, the updating period $T_{update}$ of the iterative loop in the phase 2000, i.e. ten minutes in the example in question, and the interval between two times k and k+1, i.e. one minute in the example in question. This step 1300 also includes the definition of an objective function for defining the optimisation problem. It should be noted that if the time period $T_{total}$ is longer and/or the updating period $T_{update}$ is shorter and/or the interval between two times is shorter, the calculation time is greater, hence the importance of pre-calculation in the phase 1000 of the matrices $\phi$, $\psi$, $\xi$ used for each iteration of the phase 2000.

During the final step 1400 of the initialising phase 1000, the unit 18 predefines an optimisation problem for distributing the electricity flows E'4, E8, E10, E'10, E14, E'14 from the system 2 over the time period $T_{total}$, using the model defined in the step 1200. Predefining this optimisation problem consists of generalising the state representation given by the set of equations [1] to obtain the following matrix equation [5]:

$$\tilde{Y} = \phi x_0 + \psi \tilde{U} + \xi \tilde{w} \quad [5]$$

where $x_0$ is an initial state of the system, $\tilde{Y}$, $\tilde{U}$ and $\tilde{w}$ are power, control and disturbance parameters of the system, respectively, for a period of twenty-four hours expressed in matrix form, and $\phi$, $\psi$ and $\xi$ are constant matrices wherein the elements are dependent on the constant matrices A, B, G, C, D and F defined in the step 1200. Since equation [5] is the generalisation of the state representation of the set of equations [1], the parameter $\tilde{U}$ consists of control vectors $u_0$, $u_k$, $u_{k+1}$, ... $u_{k+n}$, where n is a natural number, defining the series of controls to be applied over the period $T_{total}$. Similarly, the matrices $\tilde{Y}$ and $\tilde{w}$ consists of outputs $y_0$, $y_k$, $y_{k+1}$, ... $y_{k+n}$ and disturbances $w_0$, $w_k$, $w_{k+1}$, ... $w_{k+n}$, respectively, to be included for the period $T_{total}$ of twenty-four hours. In practice, the matrices $\phi$, $\psi$ and $\xi$ are defined by the following equations [6], [7] and [8], respectively:

$$\phi = \begin{bmatrix} C \\ CA \\ CA^2 \\ \vdots \\ CA^N \end{bmatrix} \quad [6]$$

$$\psi = \begin{bmatrix} D & 0 & \cdots & \cdots & \cdots & 0 \\ CB & D & \ddots & & & \vdots \\ CAB & CB & \ddots & \ddots & & \vdots \\ \vdots & & \ddots & \ddots & \ddots & \vdots \\ \vdots & & & \ddots & \ddots & 0 \\ CA^{N-1}B & \cdots & \cdots & CAB & CB & D \end{bmatrix} \quad [7]$$

$$\xi = \begin{bmatrix} F & 0 & \cdots & \cdots & \cdots & 0 \\ CG & F & \ddots & & & \vdots \\ CAG & GF & \ddots & \ddots & & \vdots \\ \vdots & & \ddots & \ddots & \ddots & \vdots \\ \vdots & & & \ddots & \ddots & 0 \\ CA^{N+1}G & \cdots & \cdots & CAG & CG & F \end{bmatrix} \quad [8]$$

The benefit of predefining the problem, i.e. determining the matrices $\phi$, $\psi$, $\xi$, is that of only calculating these matrices to be used for each iteration of the phase 2000 once, in order to save memory and calculation time by the optimisation unit 220.

The iterative phase 2000 comprises a fifth step 2100 for activating the iteration, a sixth step 2200 for measuring the electric powers of the system, a seventh step 2300 for updating the data of the group 300 of modules 310, 320, 330, 340, an eighth step 2400 for defining the optimisation problem, a ninth step 2500 for solving the problem defined in the step 2400 and a tenth step 2600 for applying controls for distributing energy based on the results of the step 2500.

During the fifth step 2100, the iterative phase 2000 is placed on standby until the arrival of a further updating time t, i.e. for ten minutes.

During the first step 2200 which is triggered when an updating time is reached, the consumed and produced power measurements are retrieved by each of the elements of the system 2, along with the state of charge of the battery 11. This step 2200 is suitable for updating the behaviour of the various elements of the system 2 with a view to solving the optimisation problem. In practice, measuring the various power and the state of charge of the battery makes it possible to identify the vectors u, w, y and the quantity x, thus making it possible to obtain the state representation defined by the set of equations [1] for the current updating time.

The step 2300 consists of updating the preview of the parameters of the system 2 for the period $T_{total}$, i.e. for the next twenty-four hours. This step consists of updating the energy production and consumption profiles for each of the elements 4, 8, 10, 14 of the system 2, updating the data associated with the consumption and planned use of the electric vehicle 10, and updating constraints relating to the control parameter $\tilde{U}$, the output parameter $\tilde{Y}$, the disturbance parameter $\tilde{w}$, and to a variation $\delta\tilde{U}$ between two matrices $\tilde{U}$ calculated at two consecutive times k and k+1. This update is performed by integrating the updated data from the group 300 of modules 310, 320, 330, 340 and is suitable for predicting the progression of the powers consumed and produced in the next twenty-four hours, and thus establishing the matrices $\tilde{Y}$ and $\tilde{w}$.

During the step 2400, the unit 18 formulates the optimisation problem. According to the known methods for defining such a problem, this step 2400 includes updating of the objective function $f(\tilde{U})$ defined during the step 1300, where $\tilde{U}$ is the control parameter of the system 2 for the next twenty-four hours. All the previously updated constraints are expressed in the form of the following inequality [9]:

$$A_{in}\tilde{U} \leq b_{in} \quad [9]$$

where $\tilde{U}$ is the control parameter obtained by solving the optimisation problem during the step 2500, the matrix $A_{in}$ is defined according to the following equation [10]:

$$A_{in} = \begin{bmatrix} \psi \\ -\psi \\ D_{T_{total}+1} \\ -D_{T_{total}+1} \\ [I_{N_u} O_{N_u \times N_u \cdot T_{total}}] \\ [-I_{N_u} O_{N_u \times N_u \cdot T_{total}}] \end{bmatrix} \quad [10]$$

where $$D_{T_{total}+1} = \begin{bmatrix} I_{N_u} & -I_{N_u} & 0_{N_u} & \cdots & \cdots & 0_{N_u} \\ 0_{N_u} & I_{N_u} & -I_{N_u} & & & \vdots \\ \vdots & \ddots & \ddots & \ddots & & \vdots \\ \vdots & & \ddots & \ddots & \ddots & 0_{N_u} \\ 0_{N_u} & \cdots & \cdots & 0_{N_u} & I_{N_u} & -I_{N_u} \end{bmatrix}$$

and where $\psi$ is the matrix defined in equation [7], $I_{N_u}$ is an identity matrix having the dimension $N_u$, $0_{N_u \times N_u \cdot T_{total}}$ is a zero matrix comprising $N_u$ rows and $N_u \cdot T_{total}$ columns, where $N_u$ is the number of controls of the parameter $\tilde{U}$, and the matrix $b_{in}$ is defined according to the following equation [11]:

$$b_{in} = \begin{bmatrix} \tilde{Y}_{max} - \phi x_0 - \xi \tilde{w} \\ -\tilde{Y}_{min} + \phi x_0 + \xi \tilde{w} \\ \delta \tilde{U}_{max} \\ \delta \tilde{U}_{max} \\ \delta U_0 + U_{-1} \\ \delta U_0 - U_{-1} \end{bmatrix} \quad [11]$$

where $\tilde{Y}_{max}$ and $\tilde{Y}_{min}$ are the maximum and minimum output parameters $\tilde{Y}$ for the period $T_{total}$, $\delta \tilde{U}_{max}$ is the maximum permitted control variation between two times k and k+1, $\delta U_0$ is the maximum permitted control variation at the first time, and $U_{-1}$ is the final control applied. In practice and in the example in question, the first iteration triggers, at a time $t_0$, the formulation of the optimisation problem, for a period $T_{total}$ of twenty-four hours from $t_0$ to $t_0+T_{total}$. During this iteration and using previews on the produced and consumed powers of the system 2, the optimum controls to be carried out for the next twenty-four hours are calculated so as to meet the objective function $f(\tilde{U})$ of the optimisation problem. This objective problem $f(\tilde{U})$ dependent on the user's wishes is determined, for example, so as to reduce the electricity bill, minimise $CO_2$ emissions, sell the energy produced at the best time, or favour the use of all locally produced energy.

During the step 2500, the unit 18 solves the problem defined during the step 2400 using a linear programming problem solver.

This gives the control matrix $\tilde{U}$ sought to meet, for twenty-four hours, the distribution objectives defined in the optimisation problem via the objective function.

During the step 2600, the unit 18 sends the power set-points 221 to the servo-control unit 230 which, using the power measurements 231 of the system 2, applies regulated power controls to the next updating time, i.e. for ten minutes. The phase 2000 is iterated every ten minutes so that the predictions made during the step 2300 are as close as possible to reality.

In this way, after the first iteration, the unit 18 formulates the optimisation problem at a time $t_1=t_0+T_{update}$. In particular, in the step 2400, the unit 18 formulates the optimisation problem for a time period $T'_{total}$ of twenty-four hours from $t_1$ to $t_0+T_{update}+T_{total}$. At each iteration, the calculation time t is shifted by $T_{update}$ and the twenty-four hour period is shifted accordingly.

The method is thus suitable for, every ten minutes, finding the optimal controls for distributing the energy flows of the system 2 to solve the optimisation problem subject to constraints defined in the step 2400. In this way, the method accounts for the specific characteristics of each element 4, 8, 10, 11, 14 of the system 2 and the progression thereof over time to offer the most suitable control.

With the exception of possibly the first step 1100, all the steps 1200, 1300, 1400, 2100, 2200, 2300, 2400, 2500, 2600 of the method for distribution the electricity flow are performed automatically by the monitoring unit 18.

It is thus envisaged that the configurable distribution system is more precise, adaptable and suitable for a system comprising an array of sources and types of electricity production.

In the embodiment described, the duration of the time period $T_{total}$, the duration of the updating period $T_{update}$, and the interval between two times k and k+1 were arbitrarily set to twenty-four hours, ten minutes, and one minute. They may adopt other values.

The embodiment chosen is based on a system 2 comprising a network, a local energy source, a building and an electric vehicle fitted with a storage battery. Alternatively, the system 2 may not comprise a vehicle and merely comprise one (or a plurality of) storage element(s) 11 connected directly to the distribution frame 16. In this case, the storage element 11 may be fixed and, for example, situated in another element of the system 2 such as the building 4. In further alternative embodiments, the system 2 may comprise one or a plurality of the elements 4, 8, 10, 11, 14 of the system in any technically feasible combination.

The invention claimed is:

1. A method for distributing, during a given time period, electricity flows in a system, the system including:
    at least one energy production element and one energy consumption element of electricity from the following elements:
        an electricity distribution network suitable for supplying and/or receiving energy from other elements of the system,
        an electricity storage element suitable for receiving energy production from the at least one energy production element of the system and/or for supplying energy to the at least one energy consumption element of the system,
        a building suitable for consuming energy produced locally and/or from the distribution network and/or from a storage element, and
        a local electricity production source suitable for supplying energy to the distribution network and/or building and/or storage element; and
    a monitoring unit configured to measure a state of charge of each storage element and electrical powers produced and consumed by each of the elements of the system, wherein the method comprises:
    initialisation steps including:
    a) defining physical system modelling parameters, wherein the physical system modelling parameters are physical quantities conditioning the energy consumption or production of the at least one energy production element and one energy consumption element,
    b) defining a model of the system, in the form of state representation using the physical system modelling parameters determined in step a), wherein the model of the system is defined with the following state representation:

$$\begin{cases} x_{k+1} = Ax_k + Bu_k + Gw_k \\ y_k = Cx_k + Du_k + Fw_k \end{cases}$$

where $x_k$ and $x_{k+1}$ are the states x of the system at times k and k+1, $y_k$ is an output parameter y of the system at the time k, $u_k$ is a control parameter at the time k, $w_k$ is a disturbance parameter w at the time k and A, B, G, C, D, F are constant matrices,
    c) defining optimisation parameters for solving an optimisation problem, and
    d) predefining the optimisation problem, over the given time period, for the distribution of the electricity flows of the system using the model defined in step b), wherein predefining the optimisation problem includes modelling a behaviour of the system for the given time period using the following equation:

$$\tilde{Y} = \phi x_0 + \psi \tilde{U} + \xi \hat{w}$$

where $x_0$ is an initial state of the system, $\tilde{Y}$, $\tilde{U}$ and $\hat{w}$ are power, control and disturbance parameters of the system respectively, for the given time period, expressed in matrix form, and $\Phi$, $\psi$ and $\xi$ are constant matrices wherein the elements are dependent on the constant matrices A, B, G, C, D and F; and
    iterative steps at successive updating times of the given time period, including:
    e) measuring a state of charge of each electricity storage element, and electrical powers produced and consumed by each of the various elements of the system,
    f) updating a preview of the behaviour of the production and consumption elements of the system for another time period of a same duration as a duration of the given time period and starting at a considered updating time,
    g) defining a formulation of the optimisation problem for the another time period, wherein formulating the optimisation problem comprises at least a definition of an objective function $f(\tilde{U})$ and updating of optimisation problem constraints, these constraints being expressed in the form of the following inequality:

$$A_{in}\tilde{U} \leq b_{in}$$

where $\tilde{U}$ is the control parameter for the given time period, $A_{in}$ a matrix dependent on the matrix $\psi$, and $b_{in}$ a matrix dependent on the matrices $\psi$ and $\xi$, on minimum $\tilde{Y}_{min}$ and maximum values $\tilde{Y}_{max}$ of the output parameter $\tilde{Y}$, and on a maximum variation $\delta\tilde{U}_{max}$ of the control $\tilde{U}$,
    h) solving the optimisation problem in step g) by using a solver to generate a solution, and
    i) applying electricity distribution controls in the system using the solution from step h), until a next iteration of the successive updating times of the given time period.

2. The method according to claim 1, wherein step a) comprises defining parameters for determining a production and/or consumption profile of at least one element of the system over the given time period.

3. The method according to claim 1, wherein step c) for defining the optimisation parameters comprises at least defining the given time period and defining an updating period defining an interval between two iterative steps of the successive updating times of the given time period.

4. The method according to claim 1, wherein the matrices $\phi$, $\psi$ and $\xi$ are defined by the following equations:

$$\phi = \begin{bmatrix} C \\ CA \\ CA^2 \\ \vdots \\ CA^N \end{bmatrix}$$

$$\psi = \begin{bmatrix} D & 0 & \cdots & \cdots & \cdots & 0 \\ CB & D & \ddots & & & \vdots \\ CAB & CB & \ddots & \ddots & & \vdots \\ \vdots & \ddots & \ddots & \ddots & \ddots & \vdots \\ \vdots & & \ddots & \ddots & \ddots & 0 \\ CA^{N-1}B & \cdots & \cdots & CAB & CB & D \end{bmatrix}$$

$$\xi = \begin{bmatrix} F & 0 & \cdots & \cdots & \cdots & 0 \\ CG & F & \ddots & & & \vdots \\ CAG & GF & \ddots & \ddots & & \vdots \\ \vdots & \ddots & \ddots & \ddots & \ddots & \vdots \\ \vdots & & \ddots & \ddots & \ddots & 0 \\ CA^{N+1}G & \cdots & \cdots & CAG & CG & F \end{bmatrix}.$$

5. The method according to claim 1, wherein the state x of the system corresponds to the state of charge of each electricity storage element.

6. The method according to claim 1, wherein control parameter u is defined according to the following vector:

$$u = [P_{charge}^{M11} \; P_{discharge}^{M11} \; P_{purchase}^{M14} \; P_{resale}^{M14} \; P_{localCons}^{M8}]^T$$

where $P_{charge}^{M11}$ and $P_{discharge}^{M11}$ are charge and discharge powers for each storage element, respectively, $P_{purchase}^{M14}$ and $P_{resale}^{M14}$ are purchased and resold powers for each distribution network and $P_{localCons}^{M8}$ corresponds to the local powers produced by each element of the system and consumed locally.

7. The method according to claim 1, wherein the disturbance parameter w is defined according to the following vector:

$$w = [P_{prod}^{M8} \; E_{vehicle}^{M10}]^T$$

where $P_{prod}^{M8}$ corresponds to the electrical powers produced locally by each local electricity production source, and $E_{vehicle}^{M10}$ corresponds to the energies consumed by at least one electric vehicle incorporating one or a plurality of storage elements, when said elements are not connected to the rest of the system.

8. The method according to claim 1, wherein the system output parameter is defined according to the following vector $$y = [P_{building}^{M4} \; x \; 0]^T$$

where $P_{building}^{M4}$ corresponds to power supplied to each building, and x corresponds to the state of charge of each storage element.

9. The method according to claim 1, wherein the matrix $A_{in}$ is defined according to the following equation:

$$A_{in} = \begin{bmatrix} \psi \\ -\psi \\ D_{T_{total}+1} \\ -D_{T_{total}+1} \\ [I_{N_u} \; O_{N_u \times N_u \cdot T_{total}}] \\ [-I_{N_u} \; O_{N_u \times N_u \cdot T_{total}}] \end{bmatrix}$$

where $$D_{T_{total}+1} = \begin{bmatrix} I_{N_u} & -I_{N_u} & 0_{N_u} & \cdots & \cdots & 0_{N_u} \\ 0_{N_u} & I_{N_u} & -I_{N_u} & & & \vdots \\ \vdots & \ddots & \ddots & \ddots & & \vdots \\ \vdots & & \ddots & \ddots & \ddots & 0_{N_u} \\ 0_{N_u} & \cdots & \cdots & 0_{N_u} & I_{N_u} & -I_{N_u} \end{bmatrix}$$

and $I_{N_u}$ is an identity matrix having the dimension $N_u$, $0_{N_u \times N_u \cdot T_{total}}$ is a zero matrix comprising $N_u$ rows and $N_u \cdot T_{total}$ columns, where $N_u$ is the number of controls of the parameter $\tilde{U}$, and wherein the matrix $b_{in}$ is defined according to the following equation:

$$b_{in} = \begin{bmatrix} \tilde{Y}_{max} - \phi x_0 - \xi \tilde{w} \\ -\tilde{Y}_{min} + \phi x_0 + \xi \tilde{w} \\ \delta \tilde{U}_{max} \\ \delta \tilde{U}_{max} \\ \delta U_0 + U_{-1} \\ \delta U_0 - U_{-1} \end{bmatrix}$$

where $\tilde{Y}_{max}$ and $\tilde{Y}_{min}$ are the maximum and minimum output parameters $\tilde{Y}$ for the period $T_{total}$, $\delta \tilde{U}_{max}$ is the maximum permitted control variation between two times k and k+1, $\delta U_0$ is the maximum permitted control variation at the first time, and $U_1$ is the final control applied.

10. The method according to claim 1, wherein step f) for updating a preview of the behaviour of the production and consumption elements includes updating the energy production and consumption profiles for each of the elements of the system, and updating constraints relating to the control parameter, the output parameter, the disturbance parameter, and to a variation between two matrices $\tilde{U}$ calculated at two consecutive times k and k+1.

11. A distribution device for distributing, during a given time period, electricity flows in a system, the system comprising:
   at least one energy production element and one energy consumption element of electricity from the following elements:
      an electricity distribution network suitable for supplying and/or receiving energy from other elements of the system,
      an electricity storage element suitable for receiving energy production from the at least one energy production element of the system and/or for supplying energy to the at least one energy consumption element of the system, a building suitable for consuming energy produced locally and/or from the distribution network and/or from a storage element, and a local electricity production source suitable for supplying energy to the distribution network and/or building and/or storage element; and a monitoring unit configured to measure a state of charge of each storage element and electrical powers produced and consumed by each of the elements of the system, wherein the distribution device comprises a calculator configured to implement:

initialisation steps including:

a) defining physical system modelling parameters, wherein the physical system modelling parameters are physical quantities conditioning the energy consumption or production of the at least one energy production element and one energy consumption element, b) defining a model of the system, in the form of state representation using the physical system modelling parameters determined in step a), wherein the model of the system is defined with the following state representation:

$$\begin{cases} x_{k+1} = Ax_k + Bu_k + Gw_k \\ y_k = Cx_k + Du_k + Fw_k \end{cases}$$

where $x_k$ and $x_{k+1}$ are the states x of the system at times k and k+1, $y_k$ is an output parameter y of the system at the time k, $u_k$ is a control parameter at the time k, $w_k$ is a disturbance parameter w at the time k and A, B, G, C, D, F are constant matrices, c) defining optimisation parameters for solving an optimisation problem, and d) predefining the optimisation problem, over the given time period, for the distribution of the electricity flows of the system using the model defined in step b), wherein predefining the optimisation problem includes modelling a behaviour of the system for the given time period using the following equation:

$$\tilde{Y} = \phi x_0 + \psi \tilde{U} + \xi \tilde{w}$$

where $x_0$ is an initial state of the system, $\tilde{Y}$, $\tilde{U}$ and $\tilde{w}$ are power, control and disturbance parameters of the system respectively, for the given time period, expressed in matrix form, and $\Phi$, $\psi$ and $\xi$ are constant matrices wherein the elements are dependent on the constant matrices A, B, G, C, D and F; and iterative steps at successive updating times of the given time period, including:

e) measuring the state of charge of each electricity storage element, and electrical powers produced and consumed by each of the various elements of the system, f) updating a preview of the behaviour of the production and consumption elements of the system for another time period of a same duration as a duration of the given time period and starting at considered time, g) defining a formulation of the optimisation problem for the another time period, wherein formulating the optimisation problem comprises at least a definition of an objective function $f(\tilde{U})$ and updating of optimisation problem constraints, these constraints being expressed in the form of the following inequality:

$$A_{in}\tilde{U} \le b_{in}$$

where $\tilde{U}$ is the control parameter for the given time period, $A_{in}$ a matrix dependent on the matrix $\psi$, and $b_{in}$ a matrix dependent on the matrices $\psi$ and $\xi$, on minimum $\tilde{Y}_{min}$ and maximum values $\tilde{Y}_{max}$ of the output parameter $\tilde{Y}$, and on a maximum variation $\delta \tilde{U}_{max}$ of the control $\tilde{U}$, h) solving the optimisation problem in step g) by using a solver to generate a solution, and i) applying electricity distribution controls in the system using the solution from step h), until a next iteration of the successive updating times of the given time period.

12. The distribution device according to claim 11, wherein the storage element comprises at least one storage element arranged on an electric vehicle.

13. An electric system comprising:

one energy production element and one energy consumption element of electricity from the following elements:

an electricity distribution network suitable for supplying and/or receiving energy from other elements of the system, an electricity storage element suitable for receiving energy production from the energy production element of the system and/or for supplying energy to the energy consumption element of the system, a building suitable for consuming energy produced locally and/or from the distribution network and/or from a storage element, and a local electricity production source suitable for supplying energy to the network and/or building and/or storage element;

a monitoring unit configured to measure a state of charge of each storage element and electrical powers produced and consumed by each of the elements of the system; and a distribution device including a calculator configured to implement:

initialisation steps including:

a) defining physical system modelling parameters, wherein the physical system modelling parameters are physical quantities conditioning the energy consumption or production of the one energy production element and one energy consumption element, b) defining a model of the system, in the form of state representation using the physical system modelling parameters determined in step a), wherein the model of the system is defined with the following state representation:

$$\begin{cases} x_{k+1} = Ax_k + Bu_k + Gw_k \\ y_k = Cx_k + Du_k + Fw_k \end{cases}$$

where $x_k$ and $x_{k+1}$ are the states x of the system at times k and k+1, $y_k$ is an output parameter y of the system at the time k, $u_k$ is a control parameter at the time k, $w_k$ is a disturbance parameter w at the time k and A, B, G, C, D, F are constant matrices, c) defining optimisation parameters for solving an optimisation problem, and d) predefining the optimisation problem, over a given time period, for the distribution of the electricity flows of the system using the model defined in step b), wherein predefining the optimisation problem includes modelling a behaviour of the system for the given time period using the following equation:

$$\tilde{Y} = \phi x_0 + \psi \tilde{U} + \xi \tilde{w}$$

where $x_0$ is an initial state of the system, $\tilde{Y}$, $\tilde{U}$ and $\tilde{w}$ are power, control and disturbance parameters of the system, respectively, for the given time period, expressed in matrix form, and $\phi$, $\psi$ and $\xi$ are constant matrices wherein the elements are dependent on the constant matrices A, B, G, C, D and F; and iterative steps at successive updating times of the given time period, including:
e) measuring the state of charge of each electricity storage element, and electrical powers produced and consumed by each of the various elements of the system,
f) updating a preview of the behaviour of the production and consumption elements of the system for another time period of a same duration as a duration of the given time period and starting at considered time,
g) defining a formulation of the optimisation problem for the another time period, wherein formulating the optimisation problem comprises at least a definition of an objective function $f(\tilde{U})$ and updating of optimisation problem constraints, these constraints being expressed in the form of the following inequality:

$$A_{in}\tilde{U} \leq b_{in}$$

where $\tilde{U}$ is the control parameter for the given time period, $A_{in}$ a matrix dependent on the matrix $\psi$, and $b_{in}$ a matrix dependent on the matrices $\psi$ and $\xi$, the minimum $\tilde{Y}_{min}$ and maximum values $\tilde{Y}_{max}$ of the output parameter $\tilde{Y}$, and the maximum variation $\delta\tilde{U}_{max}$ of the control $\tilde{U}$,
h) solving the optimisation problem in step g) by using a solver to generate a solution, and
i) applying electricity distribution controls in the system using the solution from step h), until a next iteration of the successive updating times of the given time period,
wherein the electricity distribution network is suitable for communicating dynamically with the distribution device, particularly on energy purchase and sale prices and/or power available from the distribution network and/or the presence of off-peak times in respect of network energy usage.

* * * * *